United States Patent [19]
Koch

[11] 3,880,886
[45] Apr. 29, 1975

[54] COUMARINS AND COUMARINIMIDES
[75] Inventor: Werner Koch, Oberwil, Basel-Land, Switzerland
[73] Assignee: Sandoz Ltd. (a/k/a Sandoz AG), Basel, Switzerland
[22] Filed: Mar. 12, 1973
[21] Appl. No.: 340,240

[30] Foreign Application Priority Data
Mar. 15, 1972 Sweden............................. 3769/72

[52] U.S. Cl....................... 260/343.2 R; 260/345.2; 252/301.1 R; 252/8.8; 8/4; 8/162 R
[51] Int. Cl............................................. C07d 7/26
[58] Field of Search.................. 260/343.2 R, 345.2

[56] References Cited
UNITED STATES PATENTS
2,927,713  3/1960  Bickoff et al. ............... 260/343.2 R
FOREIGN PATENTS OR APPLICATIONS
2,005,933  10/1970  Germany Primary Examiner—John M. Ford
Attorney, Agent, or Firm—Gerald D. Sharkin; Richard E. Vila; Joseph J. Borovian

[57] ABSTRACT
Disclosed are compounds, free from carboxylic or sulphonic acid groups, of formula I,

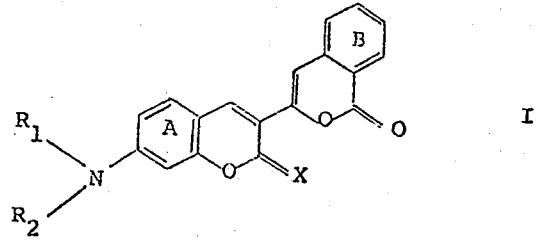

in which X is O or NH,
either $R_1$ is alkyl or phenyl and $R_2$ is hydrogen, alkyl or phenyl,
or $R_1$ and $R_2$, with nitrogen atom, signify a heterocycle, and rings A and B are further substituted or unsubstituted,
which compounds are disperse dyes and dye lasers.

17 Claims, No Drawings

COUMARINS AND COUMARINIMIDES

The invention relates to coumarin and coumarinimide derivatives.

The invention provides coumarin and coumarinimide derivatives, free from sulphonic and carboxylic acid groups, of formula I,

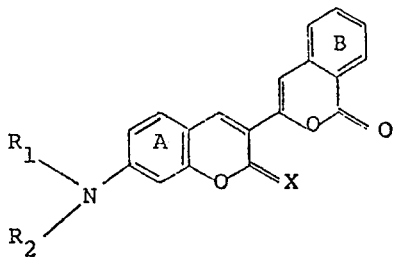

in which X signifies O or NH,
either $R_1$ signifies an unsubstituted or substituted alkyl or phenyl radical, which alkyl radical is of 1 to 6 carbon atoms, and $R_2$ signifies a hydrogen atom or an unsubstituted or substituted alkyl or phenyl radical, which alkyl radical is of 1 to 6 carbon atoms, or $R_1$ and $R_2$, together with the nitrogen atom to which they are attached, signify a five or six membered, substituted or unsubstituted, saturated, partially saturated or unsaturated heterocyclic ring, and rings A and B are further unsubstituted or substituted.

The invention also provides a process for the production of compounds of formula I, stated above, characterised by condensing a compound of formula II,

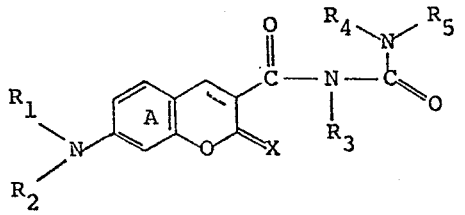

in which $R_1$, $R_2$, X and ring A are as defined above,
$R_3$ signifies a hydrogen atom, an acyl radical or an unsubstituted or substituted alkyl or phenyl radical, which alkyl radical is of 1 to 6 carbon atoms, and
either $R_4$ and $R_5$, which may be the same or different, each signifies a hydrogen atom, an acyl radical or an unsubstituted or substituted alkyl or phenyl radical, which alkyl radical is of 1 to 6 carbon atoms, or $R_4$ and $R_5$, together with the nitrogen atom to which they are attached, signify an unsubstituted or substituted, saturated, partially saturated or unsaturated five or six membered heterocyclic ring,
with a dicarboxylic acid of formula III

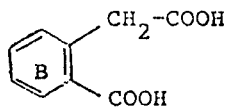

in which ring B is as defined above, or with a functional derivative of said acid.

The reaction of the compound of formula II with the dicarboxylic acid of formula III or the functional derivative thereof is conveniently carried out at a temperature of from 140° to 240°C. The reaction may be carried out in a solvent or a mixed solvent medium or, without solvent, in the melt. Suitable solvents include aromatic solvents such as trichlorobenzene, dichlorobenzene, nitrobenzene, pseudo-cumene, phthalic methyl, ethyl, propyl and butyl esters and durene. Where the reaction is carried out in the melt, the preferred reaction temperature is from 160° to 220°C.

In the compounds of formula II, $R_3$, $R_4$ and $R_5$ preferably signify hydrogen. The functional derivative of the dicarboxylic acid of formula III may, for example, be an ester or amide derivative or, preferably, the anhydride thereof.

The compounds of formula II may be obtained by condensing the aldehyde of formula IV,

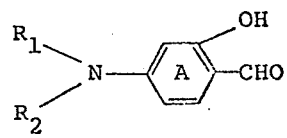

in which $R_1$, $R_2$ and ring A are as defined above, with a ureide of formula V,

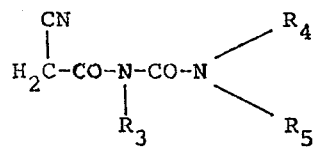

in which $R_3$, $R_4$ and $R_5$ are as defined above, to obtain compounds of formula II in which X signifies NH, and, where it is desired to obtain the corresponding compounds in which X signifies O, subjecting such compounds to hydrolysis, cleavage of the imide group-containing ring, and subsequent reclosure of the ring.

The reaction of the compound of formula IV with the compound of formula V is conveniently carried out in an inert, preferably anhydrous, solvent, for example in ethanol, methanol or, preferably, in anhydrous dimethyl formamide, dimethyl sulphoxide or dioxane. The reaction is preferably carried out in the presence of an organic base such as piperidine or pyridine. The reaction temperature is conveniently from 30° to 180°C, preferably the boiling point of the solvent and with reflux condensation. The resulting coumarinimide compound of formula II, in which X signifies NH, may be isolated in conventional manner, e.g. by evaporation and filtration, in good yield. The hydrolysis, ring cleavage and reclosure of the ring, to obtain the corresponding coumarin derivative, may be carried out, for example, by treatment in a boiling organic acid, e.g. acetic acid, or in boiling dilute mineral acid e.g. 1 to 10% hydrochloric acid. Advantageously, a water-soluble organic solvent, for example methanol or ethanol, is employed with the mineral acid.

In the compounds of formula I, any alkyl radicals as $R_1$ or $R_2$ are preferably of 1, 2, 3 or 4 carbon atoms. Preferred substituents are chlorine, bromine, alkoxy of 1 to 6 carbon atoms, preferably 1 to 4 carbon atoms, hydroxyl, cyano, thiocyano, vinyl, amino, alkylamino of 1 to 6, preferably 1 to 4 carbon atoms, dialkylamino or N-phenyl-N-alkylamino, in which the alkyl moeities are of 1 to 6, preferably 1 to 4 carbon atoms, phenyl, phenoxy, acyl, acyloxy and acylamino, any alkyl moeities in such acyl, acyloxy and acylamino substituents being of 1 to 6, preferably of 1 to 4 carbon atoms.

As substituents of any phenyl radicals in the compounds of formula I, eg. as $R_1$ or $R_2$, and as substituents of rings A and B, may be given the above substituents on the alkyl radicals and, in addition, alkyl radicals of 1 to 6, preferably 1 to 4 carbon atoms, and nitro groups. Where any phenyl radical or ring A or B is substituted, it preferably bears 1 or 2 of such substituents and, where two substituents are present, such may be the same or different. Ring A, however, is preferably unsubstituted.

Where $R_1$ and $R_2$, together with the nitrogen atom, form a heterocyclic ring, such ring may bear further hetero atoms, such as oxygen, sulphur or nitrogen.

By the term "acyl", as used herein, is meant the residue which results from removal of a hydroxyl group from an acid or hypothetical acid and is to be understood to include radicals of formulae $$R-O-CO-,\ R-SO_2-,\ R-O-SO_2-,\ R'-NR'SO_2,\\ R'-NR'CO-\ \text{and}\ R'-CO-,$$

in which R signifies an alkyl radical of 1 to 6, preferably 1 to 4, carbon atoms or a phenyl radical, and R' signifies a hydrogen atom, an alkyl radical of 1 to 6, preferably 1 to 4, carbon atoms or a phenyl radical.

The terms "acyloxy and acylamino" are to be understood accordingly.

Preferred compounds of formula I are the compounds of formula Ia,

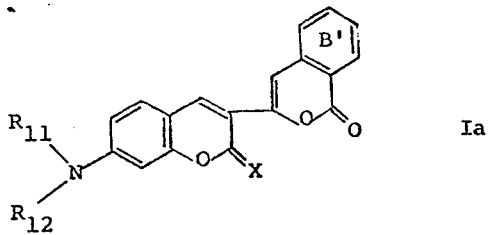

Ia in which X is as defined above,
$R_{11}$ signifies an alkyl radical of 1 to 4 carbon atoms, unsubstituted or substituted by chlorine, hydroxyl, cyano, alkoxy of 1 to 4 carbon atoms, formyloxy, alkoxycarbonyl or alkoxycarbonyloxy, in which the alkoxy moeities are of 1 to 4 carbon atoms, or dialkylamino, in which the alkyl moeities are of 1 to 4 carbon atoms,
$R_{12}$ signifies a hydrogen atom or one of the significances of $R_{11}$, above, and ring B' is unsubstituted or substituted by up to 2 substituents selected from chlorine, bromine, phenyl, amino, alkylamino or alkylcarbonylamino in which the alkyl moeities are of 1 to 4 carbon atoms, or benzoylamino.

In the compounds of formula Ia, any alkyl or alkoxy radical or moeity is preferably of 1 or 2 carbon atoms.

Preferred compounds of formula Ia are those in which ring B' is unsubstituted.

The compounds of formula I are suitable for use as disperse dyes for dyeing and printing synthetic and semi-synthetic organic fibres of high molecular weight and hydrophobic character. The dyeings obtained have notable light fastness, brilliance of shade and have pronounced greenish fluorescence.

The compounds of the invention may be incorporated in dyeing preparations by known methods, for example by grinding in the presence of dispersing agents and/or fillers, with or without subsequent vacuum or atomizer drying. The compounds may be applied by conventional exhaust dyeing, pad dyeing or printing methods.

From aqueous dispersions, the compounds build up powerfully on textile materials and are particularly suitable for dyeing and printing textiles of polyester, cellulose diacetate, cellulose triacetate and synthetic polyamide fibres using conventional methods, e.g. as described in French Patent No. 1,445,371. The dyeings obtained show notably good fastness to light, thermofixation, sublimation and pleating. They have notable wet fastness properties, for example to water, sea water, washing, perspiration and solvents, including dry cleaning liquors and to lubricants, rubbing, cross-dyeing, ozone, gas fumes and chlorine. The dyeings are stable to pre-cure and post-cure permanent press finishing processes, to soil release finishes and to varying pH conditions. They reserve wool and cotton and are stable to reducing action in the dyeings of textiles containing wool.

The compounds of formula I also exhibit high fluorescence quantum yields, being almost quantitative in such yields i.e. of the order of 0.97. They also have good thermal stability. The compounds are accordingly indicated for use as dye laser compounds, in crystalline form or preferably in a viscous liquid solvent matrix, such as in glycerol or in polyethylene glycol, e.g. polyethylene glycol 4000. Thus, the compounds, dissolved in such a solvent, may in conventional manner be used to form the active medium in a pulse laser, for example in the AVCO-EVERETT pulsed nitrogen laser. Thus, the invention provides a solution of a compound of formula I dissolved in a viscous liquid solvent, preferably in glycerol or polyethylene glycol, for use as active medium in a pulse laser.

The following Examples, in which all parts and percentages are by weight and the temperatures in degrees centigrade, illustrate the invention.

EXAMPLE 1

In a current of nitrogen gas 240 parts of homophthalic anhydride are heated to 185° to form a melt, into which 303 parts of 3-ureido-7-N-diethylaminocoumarin are slowly entered. Under the nitrogen current the melt turns dark brown to black in a short time, with powerful evolution of $CO_2$ and $NH_3$; after about 90 minutes it takes on a light colour again. After about 120 minutes the now deep red, transparent melt is allowed to cool. After pulverization it can be processed directly as a disperse dye preparation. The yellow dyeings obtained with it on polyester textiles show intense greenish fluorescence and satisfy high fastness requirements, especially as regards light fastness.

A sample purified by extraction with petroleum ether and crystallization twice from dimethyl formamide/water 1:1 has a melting point of 226°–228°.

The values obtained by elementary analysis, the 100 MHz nuclear resonance spectrum and the mass spectrum (m/e = 361) verify the molecular weight, the structure,

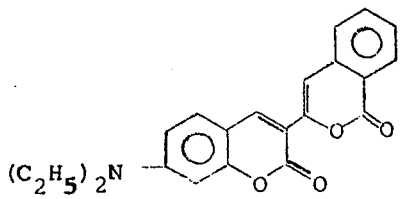

and the empirical formula $C_{22}H_{19}NO_4$.

| | | | |
|---|---|---|---|
| Found: | C 72.9% | H 5.1% | N 3.9% |
| Theory: | C 73.1% | H 5.2% | N 3.9% |

Absorption maximum in methyl alcohol:

439 m$\mu$ (log$\epsilon$ = 4.74)
398.5 m$\mu$ (log$\epsilon$ = 4.06)
246.5 m$\mu$ (log$\epsilon$ = 4.15)

Fluorescence spectrum in dimethyl formamide:

excitation maximum: 456 m$\mu$
emission band : 506 m$\mu$

Infra-red spectrum in potassium bromide:
pronounced $\nu$- lactone band at 1735 cm$^{-1}$.

The 3-ureido-7-N-diethylamino coumarin can be produced as follows. 12.7 Parts of the compound of formula NC—CH$_2$CONHCONH$_2$, produced in accordance with German Patent 175,145, and 19.3 parts of 2-hydroxy-4-N-diethylamino-benzaldehyde are dissolved in 300 parts of absolute ethanol. After the addition of 2 parts of piperidine the solution is boiled for a short time with reflux. The condensation product of formula,

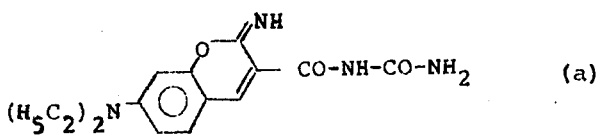

forms rapidly and settles out in the form of yellow needle-shaped crystals. It is filtered off at room temperature, washed with some ethanol and dried. 28 Parts of the compound thus formed are dissolved in 400 parts of aqueous-alcoholic hydrochloric acid (200 parts of 2% hydrochloric acid and 200 parts of ethanol). The solution is boiled for about 1 hour with reflux. The reaction product of formula,

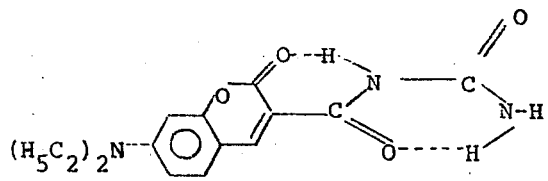

which is of brilliant yellow colour with greenish fluorescence, begins to settle out during boiling and after the reaction mixture has cooled it is isolated by filtration.

EXAMPLE 2

15.1 Parts of 2-imido-3-ureido-7-N-diethylaminocoumarin (formula (a) in Example 1) and 6.5 parts of homophthalic anhydride are dissolved in 250 parts of trichlorobenzene (a mixture of the isomers). The solution is boiled for 3 hours under nitrogen atmosphere with reflux. In the subsequent 3 hours a further 2.5 parts of homophthalic anhydride are added at constant temperature, then the reaction mixture is treated under the same conditions for a further 3 hours. On cooling, the insoluble product is filtered, washed with trichlorobenzene and then with methanol and dried. The dye thus obtained has the formula,

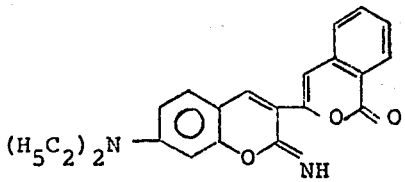

and in the dyeing properties it closely resembles the dye produced in Example 1.

The dyes listed in the following table are produced in analogy with the operating procedures of Example 1 or 2. Each of these Examples is representative of two dyes (X signifies oxygen or =NH, respectively). The position of the substituents in these dyes can be seen from the formula:

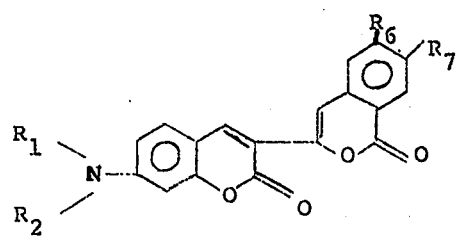

On hydrophobic fibres all these dyes give dyeings of greenish yellow shade with notable fastness properties.

| Exp. Nr. | $R_1$ | $R_2$ | $R_6$ | $R_7$ |
|---|---|---|---|---|
| 3 | $-CH_2CH_2OCOCH_3$ | $-CH_2CH_2CN$ | H | H |
| 4 | do | $-CH_2CH_2OCOCH_3$ | H | H |
| 5 | $-CH_2CH_2OCOC_2H_5$ | $-CH_2CH_2COOC_2H_5$ | H | H |
| 6 | $-CH_3$ | $-CH_2CH_2COOCH_3$ | H | H |
| 7 | $-CH_2CH_2OCOOC_2H_5$ | H | H | H |
| 8 | $-CH_2CH_2OCH_3$ | $-CH_2CH_2OCH_3$ | H | H |
| 9 | $-CH_2CH_2COOCH_3$ | $-C_2H_5$ | H | H |
| 10 | $-CH_2CH_2OH$ | $-CH_2CH_2OH$ | H | H |
| 11 | $-CH_2CH_2OCHO$ | $-CH_2CH_2OCHO$ | H | H |
| 12 | $-C_2H_5$ | $-C_2H_5$ | $-C_6H_5$ | H |
| 13 | do | do | $-NHCOC_6H_5$ | H |
| 14 | do | do | H | $-C_6H_5$ |
| 15 | do | do | H | $-N(CH_3)_2$ |
| 16 | do | do | $-NHCOCH_3$ | H |
| 17 | do | do | Cl | H |
| 18 | do | do | Br | Br |
| 19 | do | do | H | $-NH_2$ |
| 20 | $-CH_2CH_2CH_2CH_3$ | $-CH_2CH_2CH_2CH_3$ | H | H |
| 21 | $-CH_2CH_2CN$ | $-CH_2CH_2CN$ | H | H |
| 22 | $-CH_2CH(CH_3)OCOCH_3$ | do | H | H |
| 23 | $-CH_2CH_2COOCH_2CH_2CH_2CH_3$ | H | H | H |
| 24 | $-CH_2CH_2OCOOCH(CH_3)_2$ | $-CH_2CH_2OCOOCH(CH_3)_2$ | H | H |
| 25 | $-CH_2CH_2OCOCH_2CH_2CH_3$ | $-CH_2CH_2OCOCH_2CH_2CH_3$ | H | H |
| 26 | $-CH_2CH_2OH$ | $-CH_2CH_2OH$ | H | H |
| 27 | $-CH_2CH_2CN$ | " | H | H |
| 28 | $-CH_2CH_2Cl$ | $-CH_2CH_2Cl$ | H | H |
| 29 | $-CH_2CH_2CH_2N{<}^{CH_3}_{CH_3}$ | $-CH_2CH_2CH_2N{<}^{CH_3}_{CH_3}$ | H | H |

APPLICATION EXAMPLE

A mixture of 7 parts of the dye produced as described in Example 1, 4 parts of sodium dinaphthyl methane disulphonate, 4 parts of sodium cetyl sulphate and 5 parts of anhydrous sodium sulphate is ground in a ball mill for 48 hours to give a fine powder. 1 part of the powder is dispersed in a small amount of water and the dispersion added through a sieve to a bath of 4000 parts of water containing 3 parts of sodium lauryl sulphate.

At 40°–50°, 100 parts of a scoured fabric of polyester fibre are entered into this dyebath, which is then set with an emulsion of 20 parts of a chlorinated benzene in water. The bath is raised slowly to 100° and the fabric dyed for 1 to 2 hours at 95°–100°. On removal it is rinsed, soaped, rinsed again and dried. A level, brilliant greenish yellow dyeing is obtained which has notable fastness to light, washing, water, sea water, perspiration, cross dyeing, sublimation, gas fumes, thermofixation, pleating and permanent press finishing.

We claim:

1. A compound of the formula

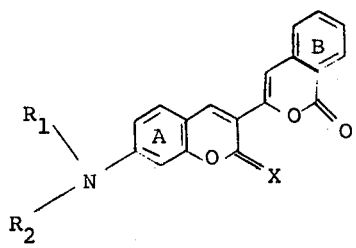

in which x is O or NH, either $R_1$ is substituted or unsubstituted and is alkyl of 1 to 6 carbon atoms or phenyl, $R_2$ is hydrogen, substituted or unsubstituted alkyl of 1 to 6 carbon atoms or substituted or unsubstituted phenyl, rings A and B may be further substituted; any substituent on substituted alkyl is chlorine, bromine, alkoxy of 1 to 6 carbon atoms, hydroxyl, cyano, thiocyano, vinyl, amino, alkylamino of 1 to 6 carbon atoms, dialkyl- or N-phenyl-N-alkylamino in which the alkyl moieties are of 1 to 6 carbon atoms, phenyl, phenoxy, acyl, acyloxy and acylamino, any substituent or substituted phenyl or on further substituted ring A or ring B is alkyl of 1 to 6 carbon atoms, nitro or a substituent specified above for alkyl, and the acyl portion of any acyl, acyloxy or acylamino groups is R—O—CO—, R—SO$_2$—, R—O—SO$_2$—, R'—NR'SO$_2$—, R'—NR'CO— or R'—CO—, in which R is alkyl of 1 to 6 carbon atoms or phenyl, and R' is hydrogen, alkyl of 1 to 6 carbon atoms or phenyl.

2. A compound according to claim 1, wherein any alkyl radicals as $R_1$ or $R_2$ are of 1, 2, 3 or 4 carbon atoms.

3. A compound according to claim 2, wherein said alkoxy is of 1 to 4 carbon atoms and in said alkylamino, dialkylamino, N-phenyl-N-alkylamino, acyl, acyloxy or acylamino, any alkyl moiety is of 1 to 4 carbon atoms.

4. A compound according to claim 1, wherein rings A and B and any phenyl radical as $R_1$ or $R_2$ are unsubstituted or substituted by up to two substituents.

5. A compound according to claim 4, wherein said alkoxy or alkyl radical is of 1 to 4 carbon atoms and in said alkylamino, dialkylamino, N-phenyl-N-alkylamino, acyl or acylamino, any alkyl moiety is of 1 to 4 carbon atoms.

6. A compound according to claim 5, wherein ring A is further unsubstituted.

7. A compound according to claim 6, of formula Ia,

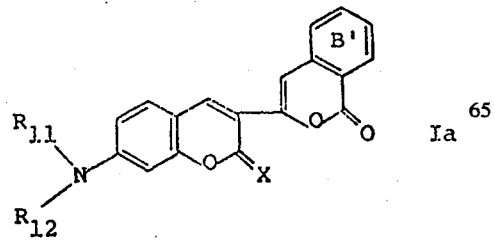

in which, $R_{11}$ signifies an alkyl radical of 1 to 4 carbon atoms, unsubstituted or substituted by chlorine, hydroxyl, cyano, alkoxy of 1 to 4 carbon atoms, formyloxy, alkoxycarbonyl or alkoxycarbonyloxy, in which the alkoxy moieties are of 1 to 4 carbon atoms, or dialkylamino, in which the alkyl moieties are of 1 to 4 carbon atoms, $R_{12}$ signifies a hydrogen atom or one of the significances of $R_{11}$, above, and ring B' is unsubstituted or substituted by up to 2 substituents selected from chlorine, bromine, phenyl, amino, alkylamino or alkylcarbonylamino in which the alkyl moieties are of 1 to 4 carbon atoms, or benzoylamino.

8. A compound according to claim 7, wherein any alkyl or alkoxy radical or moiety is of 1 to 2 carbon atoms.

9. A compound according to claim 7, wherein ring B' is unsubstituted.

10. A compound according to claim 7, wherein $R_{11}$ signifies an alkyl radical of 1 to 4 carbon atoms, unsubstituted or substituted by a methylcarbonyloxy, ethylcarbonyloxy, ethoxycarbonyloxy, methoxy, methoxycarbonyl, hydroxyl, formyloxy, cyano, methylcarbonyloxy, butyloxycarbonyl, propyloxy, carbonyloxy, propylcarbonyloxy or dimethylamino radical or by a chlorine atom.

11. A compound according to claim 7, wherein $R_{12}$ signifies a hydrogen atom or an alkyl radical of 1 to 4 carbon atoms unsubstituted or substituted by a cyano, methylcarbonyloxy, ethoxycarbonyl, methoxycarbonyl, methoxy, hydroxyl, formyloxy, propyloxycarbonyloxy, propylcarbonyloxy or dimethyl amino radical or by a chlorine atom.

12. A compound according to claim 10, wherein $R_{11}$ signifies a cyanoethyl, methylcarbonyloxyethyl, ethylcarbonyloxyethyl, methyl, ethoxycarbonyloxyethyl, methoxyethyl, methoxycarbonylethyl, hyroxyethyl, formyloxyethyl, ethyl, n-butyl, cyanoethyl, 2-methylcarbonyloxy-propyl, n-butyloxycarbonylethyl, isopropyloxy carbonyloxyethyl, n-propylcarbonyloxyethyl, hydroxyethyl, chloroethyl or dimethylaminopropyl radical.

13. A compound according to claim 11, wherein $R_{12}$ signifies a hydrogen atom or a cyanoethyl, methylcarbonyloxyethyl, ethoxycarbonylethyl, methoxycarbonylethyl, ethyl, hydroxyethyl, formyloxyethyl, n-butyl, isopropyloxycarbonyloxyethyl, n-propylcarbonyloxyethyl, chloroethyl or dimethylaminopropyl radical.

14. A compound according to claim 7, of formula,

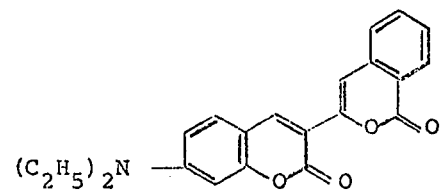

15. A compound according to claim 7, of formula,

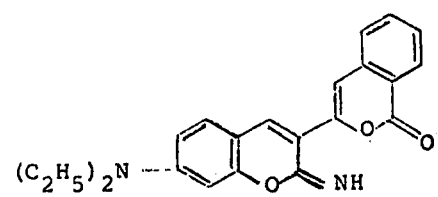

16. A process for the production of a compound of claim 1 which comprises condensing a compound of formula II,

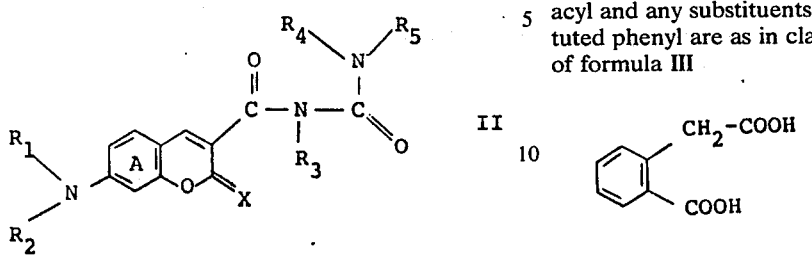

in which $R_1$, $R_2$, X and ring A are as in claim 1,
$R_3$ signifies a hydrogen atom, an acyl radical, unsubstituted or substituted alkyl of 1 to 6 carbon atoms, or unsubstituted or substituted phenyl, $R_4$ and $R_5$, which may be the same or different each signifies a hydrogen atom, an acyl radical, unsubstituted or substituted alkyl of 1 to 6 carbon atoms, or unsubstituted or substituted phenyl, and, acyl and any substituents of substituted alkyl or substituted phenyl are as in claim 1 with a dicarboxylic acid of formula III

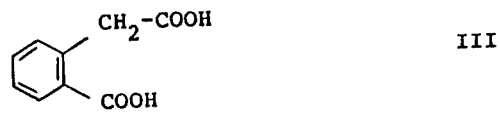

in which ring B is as defined above,
or with an ester, amide or anhydride of said acid.

17. A process according to claim 16, wherein, in the compound of formula II, $R_3$, $R_4$ and $R_5$ each signify hydrogen atoms.

* * * * *